RECORDING AND REPRODUCING DEVICE

Filed Feb. 25, 1957 6 Sheets-Sheet 1

INVENTOR
CARL T. NATIONS
BY Gravely, Lieder, Woodruff and Wills
ATTORNEYS.

Aug. 29, 1961 C. T. NATIONS 2,998,494

RECORDING AND REPRODUCING DEVICE

Filed Feb. 25, 1957 6 Sheets-Sheet 2

INVENTOR:
CARL T. NATIONS

BY Gravely, Lieder, Woodruff and Wills
ATTORNEYS.

RECORDING AND REPRODUCING DEVICE

Filed Feb. 25, 1957 6 Sheets-Sheet 3

INVENTOR:
CARL T. NATIONS

By Gravely, Lieder, Woodruff and Wills
ATTORNEYS.

INVENTOR:
CARL T. NATIONS

BY Gravely, Lieder, Woodruff and Wills
ATTORNEYS.

INVENTOR:
CARL T. NATIONS

BY Gravely, Lieder, Woodruff and Wills
ATTORNEYS.

Aug. 29, 1961
C. T. NATIONS
2,998,494
RECORDING AND REPRODUCING DEVICE
Filed Feb. 25, 1957
6 Sheets-Sheet 6
FIG. 16
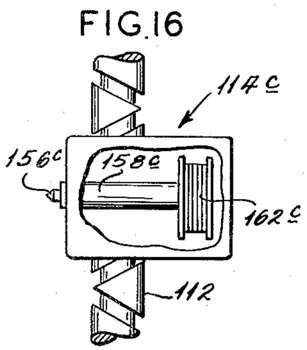
FIG. 17
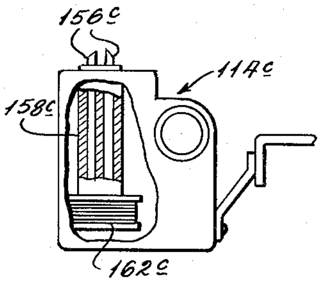
FIG. 18
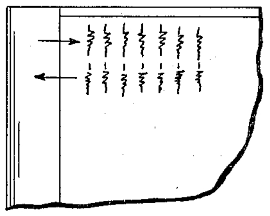
FIG. 19
FIG. 19, FIG. 22
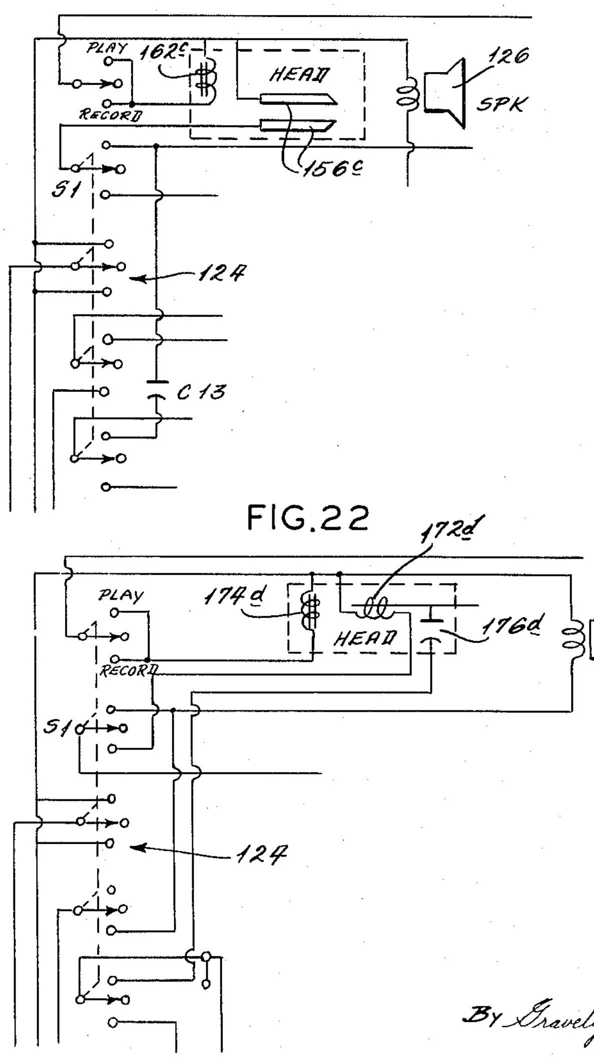
FIG. 20
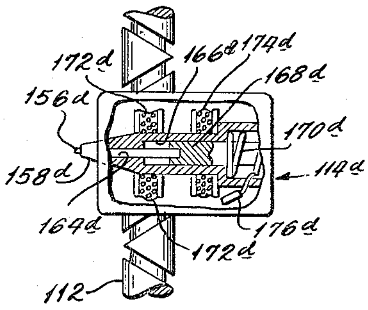
FIG. 21
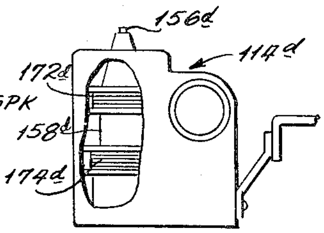
INVENTOR:
CARL T. NATIONS
BY Gravely, Lieder, Woodruff and Wills
ATTORNEYS.

2,998,494

RECORDING AND REPRODUCING DEVICE

Carl T. Nations, Orlando, Fla.
(11833—88th Ave. N., Largo, Fla.)

Filed Feb. 25, 1957, Ser. No. 641,905
8 Claims. (Cl. 179—100.2)

Figure 1:
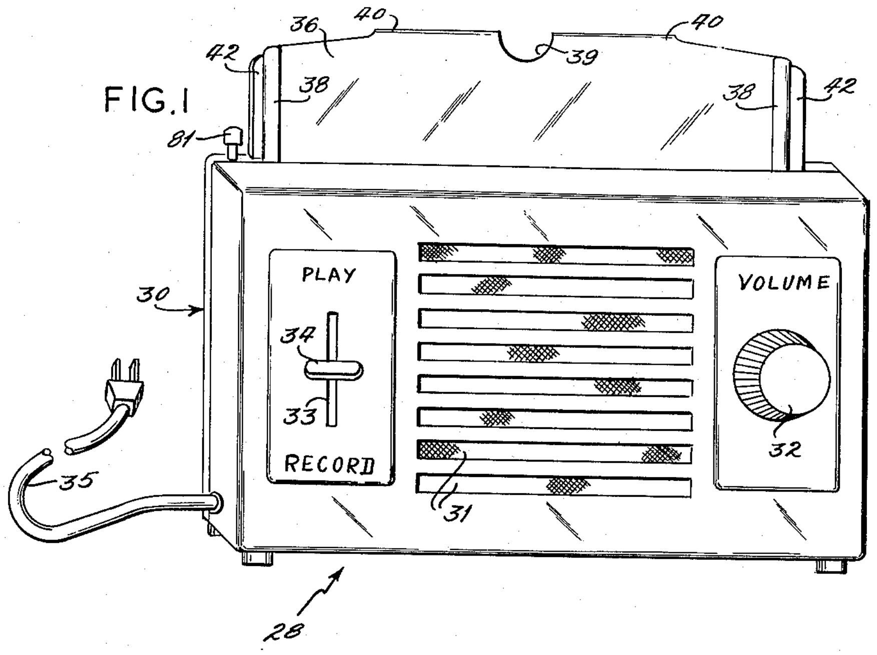

The present invention relates generally to recording and reproducing devices and more particularly to a novel device for recording and playing back sounds in which an inexpensive disposable record medium is employed.

Heretofore the art of recording and reproducing intelligence has been subject to certain disadvantages because of the high cost of the equipment involved and because of the continuing expense of having to provide additional recording media for each new recording. A device constructed according to the present invention overcomes these disadvantages of the known equipment.

The present device includes a compact integral package in which are mounted mechanism for recording and reproducing sound intelligence. The recording and reproducing mechanism comprises a recording and reproducing head, connected to suitable circuits, which scans an inexpensive disposable recording medium such as a postal card or the like while the medium is being advanced at right angles to the movement of the head. Cooperation between the head and the medium either records or reproduces sound on the medium. Several forms of the recording and reproducing head are shown and described in this specification.

It is an object of the present invention to provide a sound recording and reproducing device which employs an inexpensive disposable recording medium such as an ordinary postal card or a piece of paper.

Another object is to provide a compact, light-weight device which is inexpensive to construct and yet which is capable of accurately recording and reproducing sounds on a recording medium.

Another object is to provide a recording and reproducing device which employs substantially the same circuitry for recording as it does for reproducing sounds.

Another object is to provide a recording and reproducing device which records and reproduces sounds on a recording medium without flexing, folding, or otherwise deforming the medium.

Another object is to provide simple means for advancing a recording medium simultaneously with movement of a sound recording and reproducing head so as to produce a continuous non-overlapping message track on the medium.

Another object is to provide a device for recording and reproducing sound that can be operated by unskilled persons.

Another object is to provide a head for a sound recording and reproducing device that is capable of recording and reproducing sounds on an inexpensive disposable recording medium.

Another object is to provide simple means for positioning and aligning a record medium on a sound recording and reproducing device.

Other objects and advantages of the invention will become apparent after considering the following detailed description in conjunction with the accompanying drawings.

Figure 4:
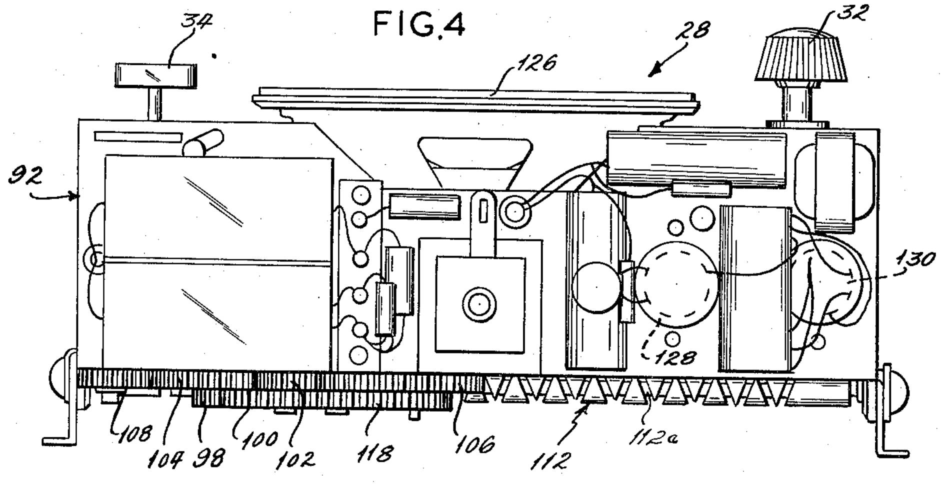
Figures 2, 6:
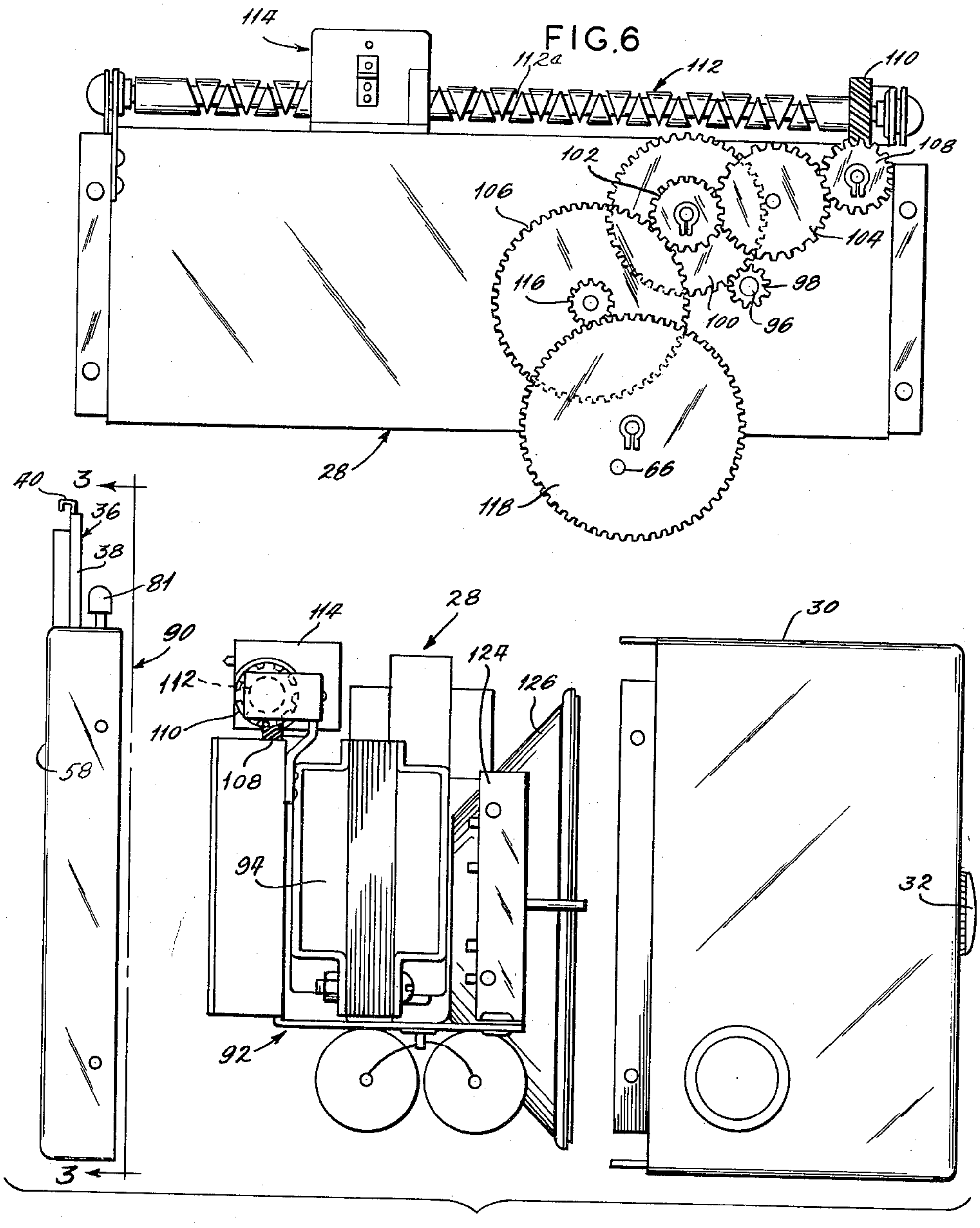
Figure 3:
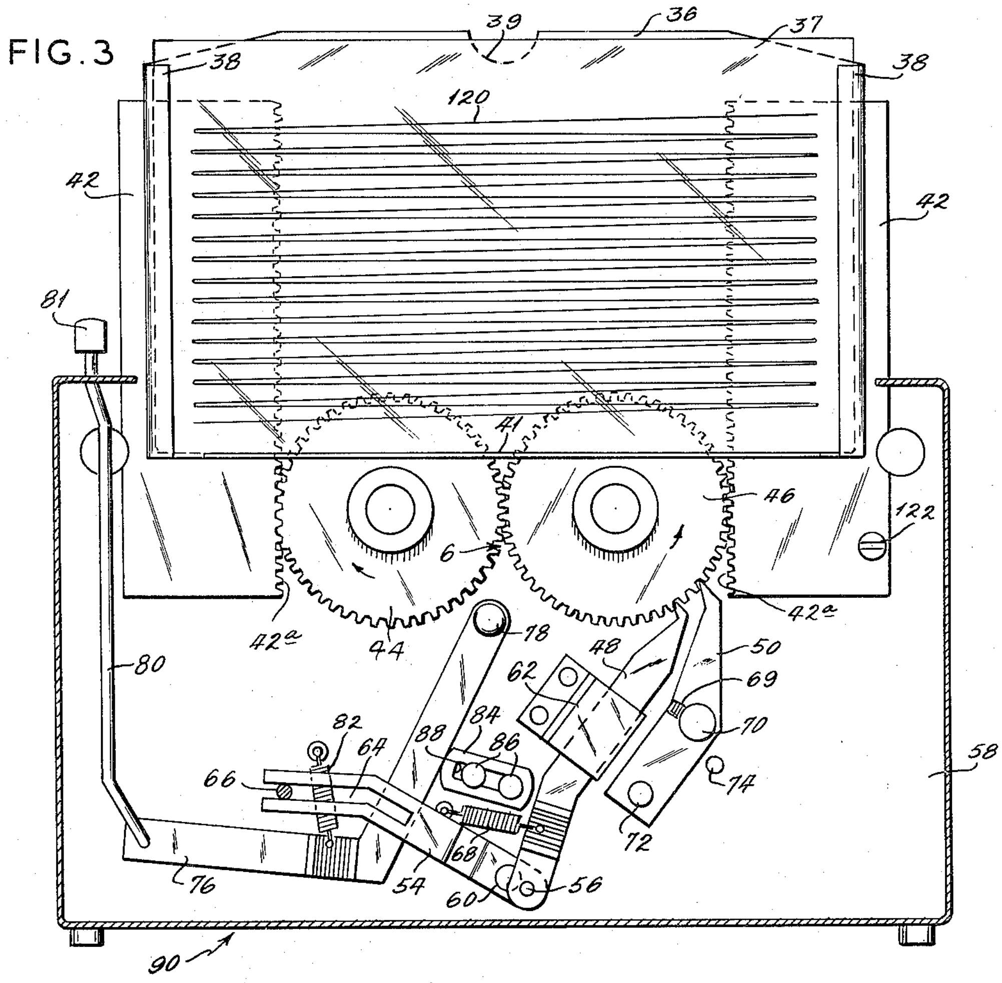
Figure 5:
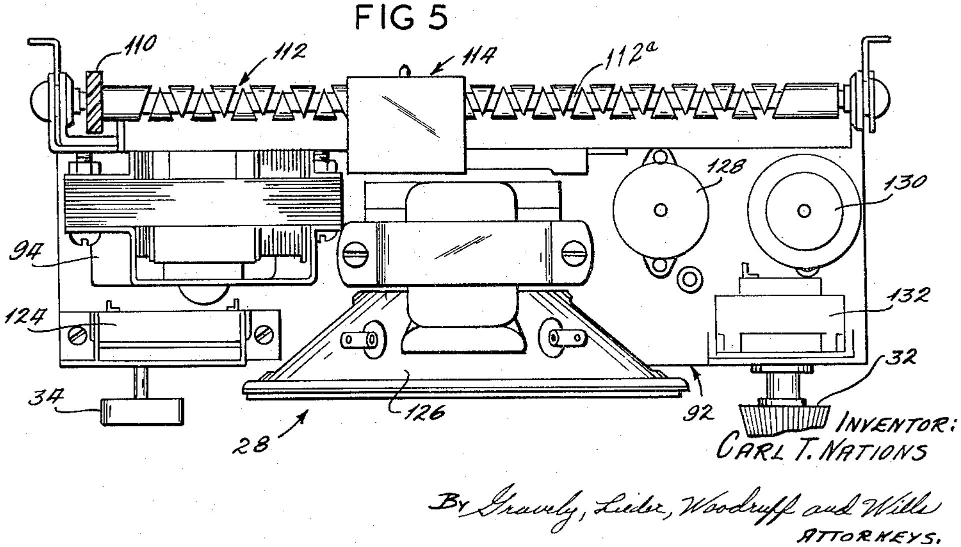
Figure 7:
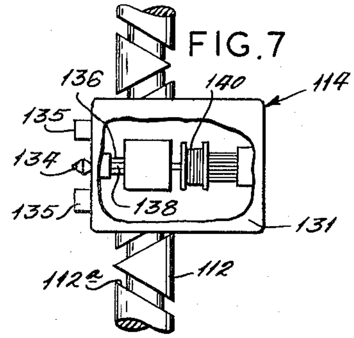
Figure 8:
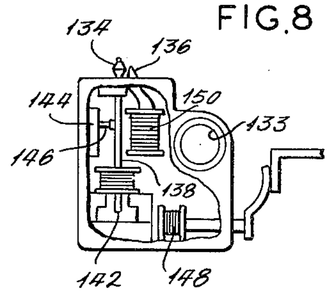
Figure 9:
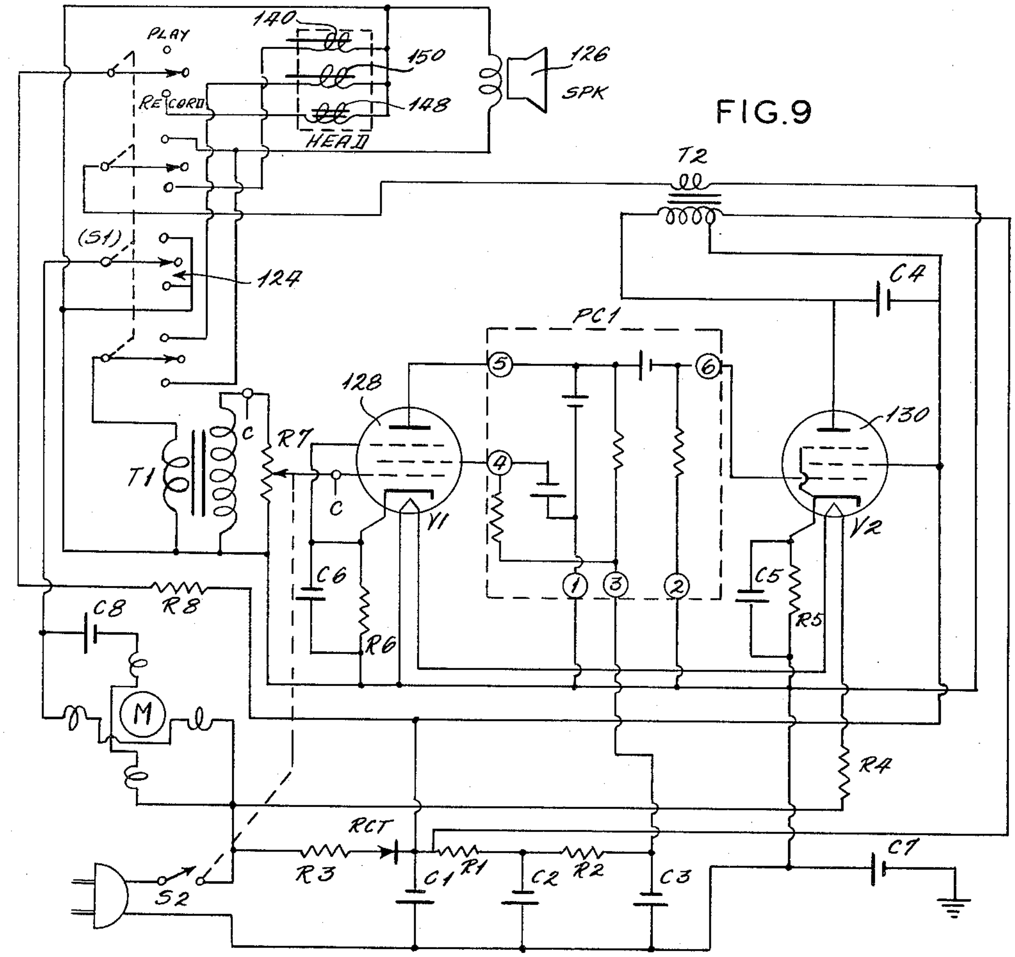
Figure 10:
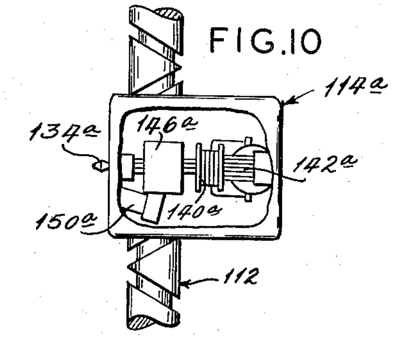
Figure 11:
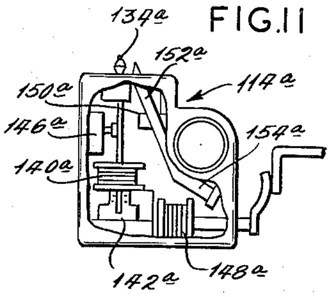
Figures 12, 14:
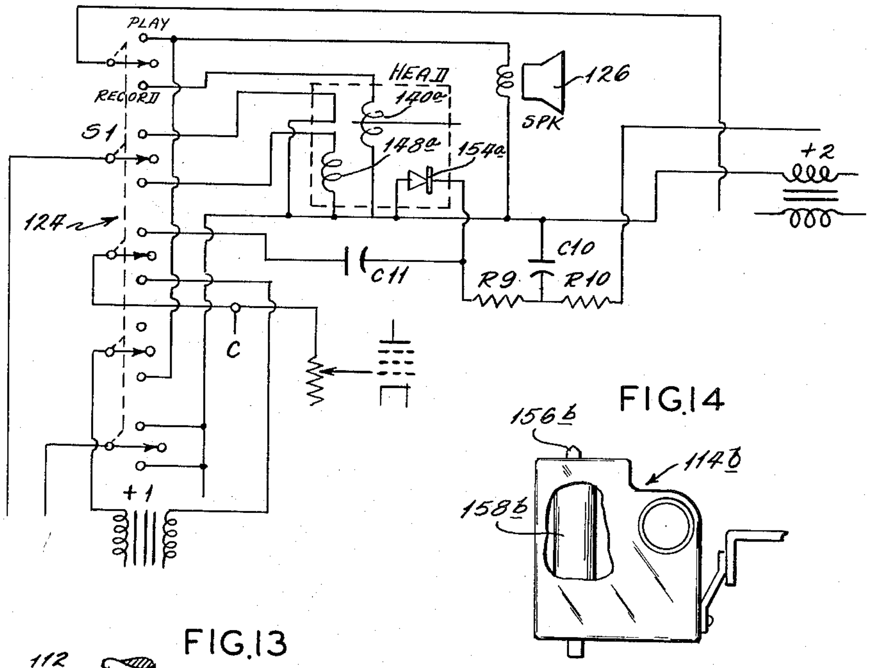
Figure 13:
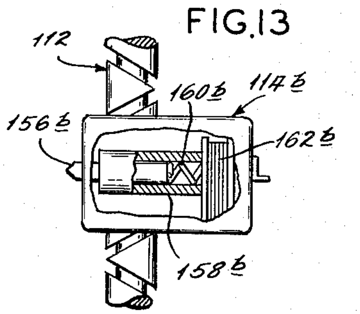
Figure 15:
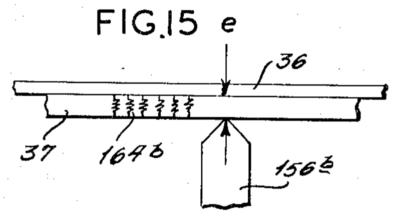

In the drawings:

FIG. 1 is a perspective view showing the front of a recording and reproducing device constructed according to the teachings of the present invention, FIG. 2 is a side elevational view of the device with the components shown in "exploded" position, FIG. 3 is a vertical view of the rear portion of the device showing the mechanism for feeding the recording medium taken along the line 3—3 in FIG. 2, FIG. 4 is a view looking upwardly at the bottom of the chassis component of the recording and reproducing device shown in FIG. 2, FIG. 5 is a view looking downwardly at the chassis component of the device shown in FIG. 2, FIG. 6 is an elevational view of the rear of the chassis component of the device of FIG. 2 showing the gear arrangement thereof, FIG. 7 is a top plan view, partly cut away, of a recording and playback head for use on the device, FIG. 8 is an elevational view as seen looking downwardly on the head shown in FIG. 7, FIG. 9 is a schematic circuit diagram of the recording and reproducing device, using a head of the type shown in FIGS. 7 and 8, FIG. 10 is a top plan view, partly cut away, showing a modification of the recording and playback head of FIGS. 7 and 8, FIG. 11 is a side elevational view, as seen looking downwardly on the modified head shown in FIG. 10, FIG. 12 is a portion of the schematic circuit diagram for using the modified head shown in FIGS. 10 and 11, FIG. 13 is a top plan view, partly cut away, showing another modification of the recording and playback head of FIGS. 7 and 8, FIG. 14 is a side elevational view as seen looking downwardly on the modified head of FIG. 13, FIG. 15 is a fragmentary horizontal sectional view showing schematically the relationship of the recording medium and rack therefor to the modified recording head of FIGS. 13 and 14, FIG. 16 is a top plan view, partly cut away, showing a variation of the modified head of FIG. 13, FIG. 17 is a side elevational view as seen looking downwardly on the head in FIG. 16, FIG. 18 is a fragmentary elevational view of the recording medium and the rack with a symbolic illustration of a sound track thereon, FIG. 19 is a portion of the schematic circuit diagram employed with the recording and playback head of FIGS. 16 and 17, FIG. 20 is a top plan view, partly cut away and partly in section, showing yet another modification of the recording and playback head of FIGS. 7 and 8

FIG. 21 is a side elevational view as seen looking downwardly on the modified head of FIG. 20, and FIG. 22 is a portion of the schematic circuit diagram for the device when employing the modified head shown in FIGS. 20 and 21.

Referring to the drawings in detail, the number 30 in FIG. 1 indicates a case for housing a sound recording and reproducing device 28 constructed according to the teachings of the present invention. The front panel of the case 30 is provided with speaker openings 31. To the right (FIG. 1) of the speaker openings 31 is a volume control knob 32, and to the left is a vertical slot 33 in which a control knob 34 is movably positioned. When the knob 34 is moved upward to "Play," the device 28 plays back a recording previously made; and when the knob 34 is moved downwardly to "Record," the device is energized for recording. Any sound, such as talking, singing, and the like, can be recorded when the knob 34 is down and played back when up. A plug-in cord 35 supplies power to the device from any suitable outlet.

Projecting upwardly through the top of the case 30 is a rack 36 which holds a paper card 37 or other suitable recording medium. Throughout this specification, reference is made to a postal card 37 (FIG. 3) which is employed as the recording medium but other forms may be used. The rack 36 (FIG. 1) which holds the card 37 is formed with folded over edges 38 along its sides which provide vertical grooves into which the card 37 is lowered from above. The upper edge of the rack 36 has a notch 39 which makes it easy to grip the card 37 when inserting or removing it from the rack 36. Flanking the notch 39 are rearwardly folding flanges 40 for raising and lowering the rack 36 when it is released, as will be described more fully hereinafter. The bottom edge of the rack 36 is formed into a ledge 41 that supports the card 37 in proper vertical alignment relative to the recording and reproducing head which will also be more fully described hereinafter.

The card rack 36 has two oppositely disposed rack gears 42 fastened on its back side (FIG. 3). The rack gears 42 have teeth 42a which are meshed with teeth on matched gears 44 and 46 and the matched gears 44 and 46 are also meshed with each other. Hence the gears 44 and 46 which are rotatably mounted on the rear panel 58 of the case 30 rotate in opposite directions when the rack 36 is moving either up or down. Furthermore, because the gears 44 and 46 are meshed with the rack gears 42 and with each other, any tendency of the rack gears 42 to move in opposite directions and thereby to get out of alignment is eliminated. This is very important because the card 37 must move smoothly and in proper alignment with the recording and reproducing head at all times.

The mechanism which drives the gears 44 and 46 is shown in FIGS. 3 and 6. In FIG. 3 the gear 46 is shown cooperating with a stepping pawl 48 and a latching pawl 50. The stepping pawl 48 is provided to advance the gear 46 (and gear 44) one tooth at a time, and the latching pawl 50 is provided to prevent the gear 46 (and gear 44) from moving backwards during recording and reproducing.

The stepping pawl 48 is pivotally connected to a rocker arm 54 by a stub shaft 56 and the rocker arm 54 is rotatably mounted on the inside rear wall 58 of the case 30 by a stud 60. A guide plate 62, also attached to the wall 58, prevents the stepping pawl 48 from becoming disengaged from the gear 46. The rocker arm 54 has a slot 64 extending into its free end which slidably receives a stud 66 attached off center to a gear 118 (to be described later). When the gear 118 rotates, the stud 66 moves in the slot 64 and causes the rocker arm 54 to oscillate. For each oscillation of the rocker arm 54, the stepping pawl 48 moves up and down and advances the gear 46 one tooth. A spring 68 is provided to bias the stepping pawl 48 into a counterclockwise position engaging the gear 46. Each time the rocker arm 54 moves clockwise (FIG. 3) the stepping pawl 48 moves down to engage a succeeding tooth on gear 46, and each time the arm 54 moves counterclockwise the stepping pawl 48 advances the gear 46 one tooth counterclockwise. When the gear 46 advances a full tooth counterclockwise, the latching pawl 50, which is biased counterclockwise by spring 69, engages the next succeeding tooth on the gear 46 and prevents reverse movement thereof. The biasing spring 69 is connected to a stud 70 on the rear case wall 58 and to the latching pawl 50. The latching pawl 50 has an elongated slot (not shown) which permits the pawl 50 to move relative to the stud 70 about a stub shaft 72. Pawl 50 is prevented from moving too far in a clockwise direction by a stop stud 74.

It is now apparent that each movement of the matched gears 44 and 46 raises the rack 36 a predetermined distance. This movement takes place in steps and is timed to coordinate with the movement of the recording head.

A rack release arm 76 (FIG. 3) is provided to disengage the stepping pawl 48 and the latching pawl 50 from the gear 46 so that the rack 36 can be manually raised and lowered. The release arm 76 is pivoted at its right end (FIG. 3) on a stud 78, and is attached at its left end to a manually operable rod 80. A spring 82 is connected intermediate the ends of the release arm 76 to maintain it in an inoperative upward position. The rod 80 extends through a hole in the top of the housing and has an operating button 81 secured thereto which when depressed, moves release arm 76 counterclockwise against a slidable link member 84. As the link member 84 moves rightwardly it engages and moves the stepping pawl 48 out of engagement with gear 46 and simultaneously the stepping pawl 48 moves the latching pawl 50 out of engagement with the gear 46. The link member 84 is slidably mounted on studs 86 positioned in an elongated link opening 88. In the inoperative position (FIG. 3) the link member 84 is in its leftward position; and in the operative position, with the rod 80 depressed, the link member 84 is moved rightwardly disengaging the stepping pawl 48 and the latching pawl 50 from the gear 46. When both pawls 48 and 50 are disengaged from the gear 46, the rack 36 is free and can be manually moved up or down as desired. The rack mechanism described above is located in the rear portion 90 of the case 30 (FIG. 2).

A chassis assembly 92 is mounted inside the front portion of the case 30 (FIG. 2). Most of the electrical components and many of the mechanical portions of the recording and reproducing mechanism are mounted on the chassis assembly 92.

The mechanical portions of the device are driven by a motor 94 (FIG. 5), the shaft 96 of which (FIG. 6) carries a gear 98 that is meshed with a larger gear 100. Attached to the same shaft with gear 100 is a smaller gear 102 which is meshed with gears 104 and 106. The gear 104 is meshed with still another gear 108. All of the gears are preferably of the helical type so that mechanical energy may be transmitted at right angles therefrom, if desired.

The gear 108 meshes (at right angles) with a cam shaft gear 110 fastened to a cam shaft 112. The cam shaft 112 (FIGS. 4, 5, and 6) has a groove 112a which cooperates with a follower on a recording and reproducing head 114. The follower (not shown) engages the walls of the groove 112a as the shaft 112 rotates and moves the head 114 back and forth along the shaft 112. The groove 112a is so formed that the head 114 moves back and forth while the cam shaft 112 rotates in one direction only.

The gear 106 (FIG. 6) is mounted on a shaft with a smaller gear 116 that meshes with a gear 118. The gear 118 carries the off center stud 66 (FIG. 3) and drives the rocker arm 54 as previously described.

It is now apparent that the motor 94 rotates the cam shaft 112 and moves the head 114 alternately back and forth along its length. At the same time the motor operates the rocker arm 54 and moves the stepping pawl 48 to advance the gears 44 and 46 and to move the rack 36 and the card 37 upwardly. Therefore, during recording and playback operations, the head 114 (which will be described in detail later) follows a path 120 (FIG. 3) back and forth across the card as the card moves upwardly. A stop element 122 (FIG. 3) is also provided to limit the upward travel of the rack 36 and to prevent the rack 36 from coming out of the device.

In FIGS. 4 and 5 are shown the bottom and top views, respectively, of the chassis 92. The circuitry, apart from the head 114, is generally of a conventional nature, and only a brief description of the more important elements is included in this specification.

Positioned at the left end of the chassis 92 is the motor 94 (FIG. 5). In front of the motor 94 and attached to the front panel of the case 30 is a switch 124 which is operated by the control knob 34. A loudspeaker-microphone 126 is mounted on the chassis to the right of the switch 124 behind the speaker openings 31. On the opposite side of the loudspeaker-microphone 126 from the motor 94 are two vacuum tubes 128 and 130, and in front of the tubes 128 and 130 is a combination on-off switch and volume control 132. Other elements including the tube sockets, the wiring, and the resistors and capacitors are shown in FIG. 4. It is anticipated that transistors and other types of electrical elements can be employed instead of particular components shown without departing from the spirit and scope of this invention.

Of particular importance to the present invention is the construction and operation of the sound recording and reproducing head 114. Several variations of the head 114 are shown in the drawings.

One such head 114 is shown in FIGS. 7 and 8. The head 114 includes a case 131 with a bore 133 therethrough that is slidably positioned on the cam shaft 112. The bore 133 is provided with a projecting cam follower (not shown) that extends into groove 112*a* in the cam shaft 112 and cooperates with the groove walls to provide the alternate back and forth movement of the head 114 when the cam shaft 112 rotates.

Projecting rearwardly from the case 131 of the head 114 (toward the card 37) is a stylus 134 which engages the recording card 37 during recording and produces a sound track thereon. The stylus 134 preferably has a fine point and employs magnetizable ink, otherwise the stylus is like a point employed on any known pen. In the drawing (FIGS. 7 and 8) the stylus 134 is shown as a ball point stylus.

Spaced on the head 114 on opposite sides of the stylus 134 and in alignment therewith are two permanently magnetized members 135 (FIG. 7). As the stylus 134 records a sound track of magnetizable ink on the card 37, the magnetized member 135 which happens to be following the stylus 134 magnetically saturates the sound track. The reason for having two magnetized members 135 is to assure that the sound track will be saturated for both directions of movement of the head 114. An ink reservoir 144 is attached to the top of the head case 131 and contains the magnetizable ink which is fed to the stylus 134 through the conduit 146 and the ink tube 138.

During a recording operation (knob 34 down), the operator talks into the loudspeaker-microphone 126 which is then connected as a microphone. The output signal from the microphone is fed to an input transformer T1 (FIG. 9) and the output of the transformer T1 is then amplified (by the vacuum tubes 128 and 130) and fed to the primary side of an output transformer T2. The secondary of transformer T2 is connected in series with the recording coil 140 which is energized thereby. The energized recording coil 140 then excites the recording motor 142 and causes the stylus 134 to vibrate and produce a wavy ink recording path 120 on the card 37. At the same time, the magnetized member 135 following the stylus 134 magnetically saturates the ink path 120.

During playback, a tipping coil 148 (FIG. 8) which is positioned in the head 114, is energized and tilts the head 114 so that the stylus 134 is out of engagement with the card 37. In the tilted position, a pointed playback core 136 which has an associated playback pick-up coil 150, moves close to the sound track 120. The sound track which is magnetically saturated induces a signal voltage in the core 136 and in the coil 150 during the playback operation as the head 114 moves back and forth across the card 37. The signal reproduced from the sound track 120 varies with the frequency of vibration of the ink path. Since the frequency of vibration of the sound track 120 has a direct relation to the amount of ink deposited by the stylus 134, and since all of the ink is magnetically saturated, the signal reproduced in the pick-up coil 150 also bears a direct relation to the recorded sounds.

To further illustrate this idea, note that the sound track 120 is more dense (due to more rapid vibration of the stylus 134) for high frequency sounds than for low frequency sounds. Therefore, since the core 136 responds to the amount of magnetic saturation present, and since the amount of magnetic saturation depends on the frequency of vibration of the ink path, the playback signal generated in the playback coil 150 is proportional to the frequency of the ink path vibration. The signal, thus produced in the playback coil 150, is fed to the input transformer T1, then to the amplifier circuits, then to the output transformer T2, and finally to the loudspeaker-microphone 126 (now operating as a loudspeaker) where the reproduced sound is actually heard.

FIG. 9 shows a schematic circuit diagram for the device 28 employing the head 114. The circuit, with the exception of the portions directly associated with the head 114, has an amplifier stage and power supply stage, both of which stages operate along known lines, and therefore, will not be described in detail in this specification. The recording coil 140, the playback coil 150, and the tipping coil 148 are identified in FIG. 9 by the same members used to identify them in FIGS. 7 and 8.

A modified form of the head 114 is shown in FIGS. 10 and 11 and is referred to as head 114*a*. The head 114*a* also employs a ball point ink stylus designated 134*a* and has a recording motor 142*a* and a recording coil 140*a*. The stylus 134*a* employs non-magnetic ink which is fed from an ink reservoir 146*a* and the recording operation is similar to the recording operation described for head 114 except that the ink sound track is not magnetically saturated. The principal difference between the head 114 and the modified head 114*a* is in the playback mechanism. Instead of having magnetic members 135, core 136, and a playback coil 150; the head 114*a* employs a light source 150*a* including a suitable lens system which focuses light on the card 37 in the region of the track. The light striking the card 37 is reflected into a transparent tube 152*a* and is directed onto a photo sensitive element 154*a* where a sound signal is produced. The signal thus produced varies according to the frequency of the line vibrations on the track 120. For a high frequency sound signal, the stylus 134*a* produces a track 120 that has many crossings or vibrations and consequently reflects less light during playback. Conversely, low frequency sounds produce fewer vibrations and consequently reflect more light from the card 37.

Included in the modified head 114*a* is a tipping coil 148*a* for tilting the head 114*a* between the recording and playback positions. When coil 148*a* is energized (device set to record) the head 114*a* is in the recording position and the stylus 134*a* engages the card 37, and when deenergized the stylus 134*a* is out of engagement with the card 37 and the head 114*a* is in the playback position. The head 114*a* (like head 114) remains in the de-energized position when the device is inoperative to avoid accidental inking of the card.

FIG. 12 shows the pertinent portions of the wiring diagram for the head 114*a* which may be connected into a circuit similar to that shown in FIG. 9 for use with head 114. The parts of the head 114*a* shown in FIG. 12 have numbers with an "*a*" suffix that correspond to similar parts on head 114*a* in FIGS. 10 and 11.

In FIGS. 13 and 14 and in FIGS. 16 and 17 are shown two head variations 114*b* and 114*c* for use with chemically treated recording cards. The chemical treatment applied to the cards forms no part of this invention. The head 114*b* shown in FIGS. 13 and 14 has a single stylus 156*b* which is slidably positioned in an insulating cylinder 158*b*. A loading spring 160*b* is positioned behind the stylus 156*b* in the insulating cylinder 158*b* and urges the stylus into an extended position. An expel coil 162*b* is also provided to move the stylus 156*b* into engagement with the card 37 during recording and playback and to disengage the stylus 156*b* from the card 37 when the device is inoperative.

During a recording operation a signal voltage is impressed through the card 37 between the stylus 156*b* and ground on the card rack 36. As the head 114*b* moves back and forth across the card 37, the signal voltage thus impressed causes the resistance through the treated card 37 to vary. Being chemically treated, the card retains the varying resistance along the recording track 120 and during playback the same stylus **156*b* responds to the varying resistance of the sound track 120 by reproducing the sound signal therefrom. During the playback operation, a D.C. voltage is on the stylus 156*b*. The D.C. voltage responds to the varying resistance of the sound track and reproduces the sound signal therefrom. The signal thus reproduced is fed to the amplifier circuits and then to loudspeaker 126 where it is heard. FIG. 15 shows a segment of treated card 37 taken along a portion of the sound track. For illustrative purposes the sound track is shown as consisting of a series of small resistances 164*b***.

The head **114*c* shown in FIGS. 16 and 17 operates similarly to the head 114*b*, the principal difference being in the provision of two spaced styli 156*c* instead of one. The styli 156*c* in head 114*c* are insulated from each other, and are arranged to traverse over the card 37 along the upper and lower edges of the sound track 120. The styli 156*c* are positioned in an insulator member 158*c*, and an expel coil 162*c* is provided for moving the styli 156*c* into and out of engagement with the treated card 37**.

As head 114c traverses the card, the styli **156*c* produce a sound track thereon in a manner similar to that described for head 114*b*. However, instead of producing a varying resistance sound track through the card as in the case of head 114*b*, the head 114*c* produces a varying resistance sound track between the two parallel paths followed by the spaced styli 156*c*. For playback then, a D.C. voltage is impressed between the spaced styli 156*c* and a signal is produced at the styli responsive to changes in track resistance. This signal thus produced is amplified and fed to the loudspeaker 126**.

FIG. 19 shows the circuit diagram for the head **114*c*. A similar circuit is also provided for a device employing the head 114*b* which has only one stylus 156*b*. The rest of the circuitry employed with heads 114*b* and 114*c*** may be similar to that shown in FIG. 9.

Another modified head, designated **114*d*, is shown in FIGS. 20 and 21. The head 114*d* can be used to record and reproduce on a plain untreated post card or an ordinary piece of paper. The head 114*d* employs a stylus 156*d* constructed of a special composition material which has the property of producing marks on the medium only when excited electromagnetically. In order to electromagnetically excite the stylus 156*d* as the head 114*d* moves along the recording path, a recording coil 172*d* is mounted in the head 114*d* circumscribing the stylus 156*d* (FIGS. 20 and 21). The recording coil 172*d* is connected to the output of the amplifier circuits and is excited by the amplified sound signal from the loudspeaker-microphone 126 during recording. The chemical composition of the stylus 156*d*** forms no part of this specification.

The stylus **156*d* is slidably positioned in a bore 164*d* in the tapered end of an insulator tube 158*d* and extends therefrom much the same as does the lead in an automatic pencil. To the right in the insulator tube 158*d* (FIG. 20) is a larger bore 166*d* which connects with the bore 164*d* and extends through the rear of the insulator tube 158*d*. A stylus back-up member 168*d* is slidably positioned in the bore 166*d* and is connected to the stylus 156*d*. The back-up member 168*d* is biased by a spring 170*d* so that the stylus 156*d* is in a retracted or less extended position in the head 114*d* when the head is not being used. In this position the stylus 156*d*** is out of contact with the recording medium.

An expel coil **174*d* is mounted in the head 114*d* rearwardly of the recording coil 172*d* and is energized for recording and for reproducing to move the stylus 156*d*** outwardly into engagement with the medium.

When the recording coil **172*d* is energized by the amplified sound signal, it causes the extended stylus 156*d* to rub or wipe off onto the card 37 and to produce a sound track thereon. Since the recording coil 172*d* is excited by the amplified sounds being recorded, the stylus 156*d* records a sound track that also varies with the amplified sound signal. When the recording coil 172*d* is deenergized, the stylus 156*d*** is unable to rub of on the record medium.

During playback the stylus **156*d* moves along the sound track previously made and produces a contact potential therewith which varies in proportion to the amount of the material deposited on the track. The amount of material deposited during a recording operation is proportional to the recorded signal, and the contact potential produced between the stylus 156*d* and the sound track during playback is proportional to the amount of material forming the sound track. The playback signal thus produced is then fed through a capacitor 176*d* in the head 114*d* (FIG. 20) to the input of the amplifier system. FIG. 22 shows the circuit diagram of the modified head 114*d* with the components thereof properly designated. The rest of the circuitry employed with the head 114*d*** is similar to that shown in FIG. 9.

It is anticipated that a laminated core head such as employed on known tape recorders could also be employed on the present device 28. Such a head would require a card or record medium treated with a magnetizable material such as iron oxide.

Thus, it is apparent that there has been provided as a single compact unit, a novel device including a novel recording and reproducing head therefor for recording and reproducing sounds on an inexpensive disposable recording medium which fulfills all of the objects and advantages sought therefor.

It is to be understood, however, that the foregoing description and accompanying drawings have been presented only by way of illustration and example and that changes, alterations and modifications to the present disclosure which will be readily apparent to one skilled in the art, are contemplated as being within the scope of the present invention which is limited only by the claims which follow.

What I claim is:

1. A device for recording or reproducing sounds on a surface of an object comprising means for positioning the object during recording and reproducing operations; means for moving the object in the plane of the recording surface during recording and reproducing operations; recording and reproducing means including a recording and reproducing head mounted adjacent to the recording surface, means moving said head back and forth across the recording surface transversely to the direction of the movement of the object so that the head scans the recording surface along the same path during recording and reproducing operations, said head including an ink recording stylus adapted to engage the recording surface during recording operations to make an ink sound track on the surface, said ink sound track being formed in part of magnetic retentive particles, electro magnetic means positioned adjacent to the ink stylus and responsive to sound modulated signal voltages for exciting said stylus to vibrate during recording operations for producing an ink sound track that varies in accordance with the characteristics of the sounds being recorded, other means positioned adjacent to the stylus for magnetizing the magnetic retentive particles in the sound track during recording operations, still other means on the head responsive to the magnetized ink sound track for reproducing sound therefrom during reproducing operations, and means for moving said head between a recording position in which the ink stylus engages the recording surface and a reproducing position in which the means responsive to the magnetic sound track move adjacent to the recording surface.

2. A device for recording or reproducing sounds on a plain paper record comprising a housing having electrical and mechanical components mounted thereon, said electric components including cooperatively connecting sound amplifying means, loudspeaker-microphone means, and selector switch means for selecting between a sound recording and sound reproducing operation, said mechanical components including movable rack means mounted on the housing for positioning the paper record in an undeformed condition, means for moving the rack means in one direction and in periodic steps during sound recording and reproducing operations, a sound recording and reproducing head mounted adjacent to the paper record, means for moving said head in a direction transverse to the direction of movement of the rack means, said head including an ink marking stylus which engages the record during sound recording operations for producing a sound track, electronic magnetic means connected to the electric components and associated with the marking stylus for vibrating said stylus in response to sound signals produced in the electrical components during recording operations, other means on said head responsive to the characteristics of the sound track, said last named means being movable adjacent to the sound track during sound reproducing operations for reproducing sound signals from the sound track in the electrical components, and means for moving said head between the sound recording and the sound reproducing positions in response to changes in the selector switch means.

3. The device defined in claim 2 wherein said sound track is formed of ink having magnetizable particles and said head includes means positioned adjacent to the marking stylus for magnetizing said particles during recording operations.

4. The device defined in claim 3 in which said reproducing means includes a magnetic sensitive element.

5. A device for recording and reproducing sound on an object having a plain surface comprising a housing having electrical and mechanical components mounted thereon, said electrical components including cooperatively connected sound amplifying means, loudspeaker-microphone means, and selector switch means for selectively switching between a sound recording and a sound reproducing operation, said mechanical components including movable rack means for positioning the plain surfaced object and for moving the object in periodic steps during recording and reproducing operations, and a sound recording and reproducing head mounted adjacent to the plain surface of the object, said head including an ink stylus engageable with said plain surface during a recording operation for depositing magnetizable ink in a continuous sound track on the surface of the object to form a sound track, electronic magnetic means associated with said stylus and energized by electrical signals generated in the electrical components for exciting said stylus during recording operations whereby the ink sound track is modulated in response to said electrical signals, means positioned adjacent to the stylus for magnetizing the modulated ink sound track during recording operations, and means responsive to said selector switch means for moving the head between a sound recording and a sound reproducing position.

6. The device defined in claim 5 wherein said head includes a magnetically sensitive member which moves adjacent to the magnetized ink sound track during reproducing operations, said member responding to the magnetic characteristics of the sound track for reproducing signal therefrom in the electric components.

7. A sound recording and reproducing head adapted to be employed for recording and reproducing sounds on a paper record medium comprising a stylus, a reservoir of magnetizable ink communicating with the stylus, said stylus engaging and moving on the record medium during sound recording to record a track of said magnetizable ink thereon, electromagnetic means capable of generating a sound modulated signal operatively associated with the stylus and adapted to excite the stylus during the recording movement thereof to modulate the ink track according to the sound modulated signal, means positioned adjacent to the stylus for magnetizing the ink sound track during the recording operation, magnetically sensitive means on said head movable adjacent said sound track during sound reproducing operations, said sensitive means responding to the magnetized sound track for reproducing sounds therefrom, and means for moving said head between a sound recording and a sound reproducing operation.

8. The recording and reproducing head defined in claim 7 in which the means responsive to the magnetized sound track include a magnetically sensitive member and a coil associated therewith.

References Cited in the file of this patent

UNITED STATES PATENTS

| | | |
|---|---|---|
| 1,089,835 | Gregory | Mar. 10, 1914 |
| 2,258,106 | Bryce | Oct. 7, 1941 |
| 2,468,198 | Heller | Apr. 26, 1949 |
| 2,484,298 | Krahulec | Oct. 11, 1949 |
| 2,644,031 | Klyce | June 30, 1953 |
| 2,657,062 | Meunier | Oct. 27, 1953 |
| 2,726,288 | Ellis | Dec. 6, 1955 |
| 2,743,317 | Roberts | Apr. 24, 1956 |
| 2,917,588 | White | Dec. 15, 1959 |
| 2,922,654 | Brasseur | Jan. 26, 1960 |

FOREIGN PATENTS

| | | |
|---|---|---|
| 180,424 | Austria | May 15, 1954 |
| 703,916 | France | Feb. 16, 1931 |
| 1,041,699 | France | Apr. 5, 1951 |